(12) United States Patent
Tomizawa et al.

(10) Patent No.: US 8,230,365 B2
(45) Date of Patent: Jul. 24, 2012

(54) DOCUMENT MANAGEMENT SYSTEM, DOCUMENT MANAGEMENT METHOD AND DOCUMENT MANAGEMENT PROGRAM

(75) Inventors: Hajime Tomizawa, Shizuoka-ken (JP); Akihiko Fujiwara, Kanagawa-ken (JP)

(73) Assignees: Kabushiki Kaisha Kaisha, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 566 days.

(21) Appl. No.: 12/137,724

(22) Filed: Jun. 12, 2008

(65) Prior Publication Data

US 2009/0113351 A1 Apr. 30, 2009

Related U.S. Application Data

(60) Provisional application No. 60/983,428, filed on Oct. 29, 2007.

(51) Int. Cl.
*G06F 17/00* (2006.01)
*G06F 3/048* (2006.01)

(52) U.S. Cl. ......... 715/853; 715/243; 715/246; 715/854

(58) Field of Classification Search .................. 715/243, 715/246, 853, 854
See application file for complete search history.

(56) References Cited

U.S. PATENT DOCUMENTS

| | | | | |
|---|---|---|---|---|
| 2002/0010715 A1* | 1/2002 | Chinn et al. | ................ | 707/514 |
| 2004/0098363 A1* | 5/2004 | Anglin et al. | ................ | 707/1 |
| 2004/0236805 A1* | 11/2004 | Gordon | ................ | 707/205 |
| 2005/0289107 A1* | 12/2005 | Arrouye et al. | ................ | 707/1 |
| 2007/0022072 A1* | 1/2007 | Kao et al. | ................ | 706/45 |
| 2007/0168382 A1* | 7/2007 | Tillberg et al. | ................ | 707/102 |
| 2008/0244385 A1* | 10/2008 | Zukowski et al. | ................ | 715/255 |
| 2009/0073501 A1* | 3/2009 | Gutarin | ................ | 358/403 |

OTHER PUBLICATIONS

Orkut Buyukkokten, Hector Garcia-Molina, and Andreas Paepcke. 2001. Accordion summarization for end-game browsing on PDAs and cellular phones. In Proceedings of the SIGCHI conference on Human factors in computing systems (CHI '01). ACM, New York, NY, USA, 213-220.*

Min-Yuh Day, Richard Tzong-Han Tsai, Cheng-Lung Sung, Chiu-Chen Hsieh, Cheng-Wei Lee, Shih-Hung Wu, Kun-Pin Wu, Chorng-Shyong Ong, and Wen-Lian Hsu. 2007. Reference metadata extraction using a hierarchical knowledge representation framework. Decis. Support Syst. 43, 1 (Feb. 2007).*

Mischa Weiss-Lijn, Janet T. McDonnell, and Leslie James. 2002. An Empirical Evaluation of the Interactive Visualization of Metadata to Support Document Use. In Visual Interfaces to Digital Libraries [JCDL 2002 Workshop], Katy B\&\#246;rner and Chaomei Chen (Eds.). Springer-Verlag, London, UK, 50-64.*

* cited by examiner

*Primary Examiner* — William Bashore
*Assistant Examiner* — Andrea Long
(74) *Attorney, Agent, or Firm* — Turocy & Watson, LLP

(57) ABSTRACT

There is provided a technique which can contribute to the improvement of management efficiency of a document file. Metadata relating to a document as a management object are acquired, and the plural metadata are hierarchically displayed in a tree form based on respective attributes of the acquired plural metadata.

18 Claims, 20 Drawing Sheets

FIG.3

2007 3/9 MEETING ROOM B

REGULAR MEETING MATERIAL
REVIEW OF EXHIBITION
CONTENT OF EXHIBITION

■ PREFACE

....................................
............................
................................
..................................
....

■ CANDIDATE OF EXHIBITION CONTENT

| CONTEXT ITEM | VALUE |
|---|---|
| FILE NAME | Doc0002.pdf |
| FILE CREATION DATE | 2007/03/15 17:28:27 |
| SCAN PLACE | MEETING ROOM B |
| SCAN RESOLUTION | 300dpi |
| SHEET SIZE | A4 |

FIG.5

| AREA MEANING | VALUE |
|---|---|
| TITLE | REGULAR MEETING MATERIAL |
| HEADER | 2007 3/9 MEETING ROOM B |
| SUBTITLE | REVIEW OF EXHIBITION CONTENT OF EXHIBITION |
| SUBHEADING 1 | PREFACE |
| SUBHEADING 2 | CANDIDATE OF EXHIBITION CONTENT |
| FOOTER | -1- |

FIG.11

2007 3/9 MEETING ROOM B

REGULAR MEETING MATERIAL
REVIEW OF EXHIBITION
CONTENT OF EXHIBITION

■ PREFACE

・・・・・・・・・・・・・・・・・・・・・・・・・
　　・・・・・・・・・・・・・・・・
　　・・・・・・・・・・・・・・・・・・・・・
　　・・・・・・・・・・・・・・・・・・・・・・・
　　・・・・

■ CANDIDATE OF EXHIBITION CONTENT

・・・・・・・・・・・・・・・・・・・・・・・・・・・
　　・・・・・・・・・・・・・・・・・・・・・・・・・・
　　・・・・・・・・・・・・・・・・
　　・・・・・・・・・・・・・・・・・・・・・・・・
　　・・・・・・・・・・・・・・・・・・・・・・・・・・
　　・・・・・・・・・・・・・・・・・・・・・・

−1/3−

FIG.12
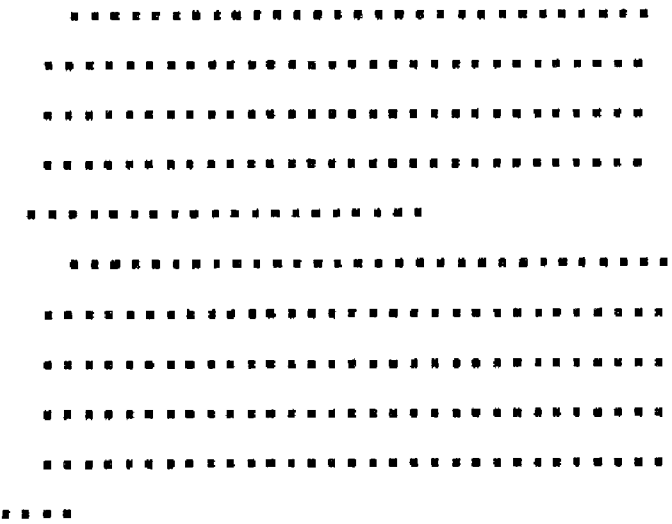
2007 3/9 MEETING ROOM B
■ LAYOUT OF MEETING PLACE
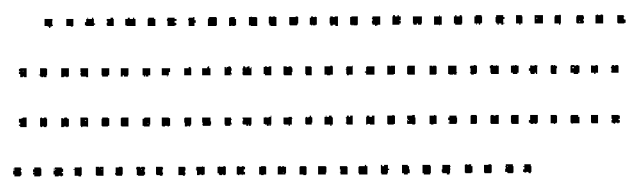
■ CARRYING-IN OF EXHIBITS
-2/3-

FIG.15

| ID | AREA MEANING | TEXT DATA |
|---|---|---|
| 1101 | HEADER | 2007 3/9 MEETING ROOM B |
| 1102 | TITLE | REGULAR MEETING MATERIAL |
| 1103 | SUBTITLE | REVIEW OF EXHIBITION CONTENT OF EXHIBITION |
| 1104 | SUBHEADING 1 | PREFACE |
| 1105 | SUBHEADING 2 | CANDIDATE OF EXHIBITION CONTENT |
| 1106 | FOOTER | -1- |

FIG.16

| ID | AREA MEANING | TEXT DATA |
|---|---|---|
| 1201 | HEADER | 2007 3/9 MEETING ROOM B |
| 1202 | SUBHEADING 1 | LAYOUT OF MEETING PLACE |
| 1203 | SUBHEADING 2 | CARRYING-IN OF EXHIBITS |
| 1204 | FOOTER | -2- |

FIG.17

| ID | AREA MEANING | TEXT DATA |
|---|---|---|
| 1301 | TITLE | MEETING MEMO |
| 1302 | SUBTITLE | 2007 3/9 |

FIG.18

| BUNDLE NUMBER | AREA MEANING | TEXT DATA |
|---|---|---|
| 1 | TITLE | REGULAR MEETING MATERIAL |
| 1 | HEADER | 2007 3/9 MEETING ROOM B |
| 1 | SUBTITLE | REVIEW OF EXHIBITION CONTENT OF EXHIBITION |
| 1 | SUBHEADING 1 | PREFACE |
| 1 | SUBHEADING 2 | CANDIDATE OF EXHIBITION CONTENT |
| 1 | SUBHEADING 3 | LAYOUT OF MEETING PLACE |
| 1 | SUBHEADING 4 | CARRYING-IN OF EXHIBITS |
| 2 | TITLE | MEETING MEMO |
| 2 | SUBTITLE | 2007 3/9 |

DOCUMENT MANAGEMENT SYSTEM, DOCUMENT MANAGEMENT METHOD AND DOCUMENT MANAGEMENT PROGRAM

BACKGROUND OF THE INVENTION

1. Field of the Invention

The present invention relates to a management technique of a document file, and particularly to a document management technique using metadata.

2. Description of the Related Art

Hitherto, there is known a technique in which when a document image file is stored in a storage device, metadata such as a title or the number of pages is acquired automatically or by instructions from a user, is correlated with the document image file, and is stored (see, for example, JP-A-2002-73641). In this related art, when a list of files stored in the storage device is read, the metadata correlated with these files are displayed.

Besides, there is also known a technique in which page images of document image files stored in a storage device are listed and displayed with thumbnail images (see, for example, JP-A-2006-178989). In this related art, the display of the thumbnail images is performed such that title portions in the page images or partial images of main drawings are enlarged, and the partial images to be presented are switched and displayed.

However, in the related art, since the metadata of the document image files or the number of partial images is limited and is presented to the user, there is a case where the information presented when the user determines the content of the file is insufficient. On the other hand, when all the metadata of the document image files and all the page images are displayed, there is a problem that the display space becomes insufficient, or the amount of information to be displayed becomes large and it becomes difficult to understand what files are displayed.

SUMMARY OF THE INVENTION

It is an object of the present invention to provide a technique which can contribute to the improvement of management efficiency of a document file.

In order to solve the foregoing problem, according to an aspect of the invention, a document management system includes a metadata acquisition unit configured to acquire metadata relating to a document as a management object, and a display control unit configured to hierarchically display the plural metadata in a tree form based on respective attributes of the plural metadata acquired by the metadata acquisition unit.

Besides, according to another aspect of the invention, a document management method includes acquiring metadata relating to a document as a management object, and hierarchically displaying plural metadata in a tree form based on respective attributes of the acquired plural metadata.

Besides, according to still another aspect of the invention, a document management program causes a computer to execute a process including acquiring metadata relating to documents as management objects, and hierarchically displaying the plural metadata in a tree form based on respective attributes of the acquired plural metadata.

DESCRIPTION OF THE DRAWINGS

FIG. 3 is a view showing an example of a document image file having a page image as a management object in the embodiment.

FIG. 4 is a view showing an example of data content, such as a file name, a file creation date, and a scan place, as metadata stored in a metadata storage unit 102.

FIG. 5 is a view showing an example of a data table to store content metadata extracted by an area meaning determination unit 105 and a content extraction unit 103.

FIG. 11 is a view showing an example of a first page image included in a document image file.

FIG. 12 is a view showing an example of a second page image included in the document image file.

FIG. 15 is a view showing an example of area meanings of character areas as metadata acquired from the first page image and text data thereof.

FIG. 16 is a view showing an example of area meanings of character areas as metadata acquired from the second page image and text data thereof.

FIG. 17 is a view showing an example of area meanings of character areas as metadata acquired from the third page image and text data thereof.

FIG. 18 is a view showing metadata acquired from the page images of a document image file and finally stored in a metadata storage unit 102.

DESCRIPTION OF THE EMBODIMENTS

Hereinafter, embodiments of the present invention will be described with reference to the drawings.

(First Embodiment)

First, a first embodiment of the invention will be described.

Figure 1:
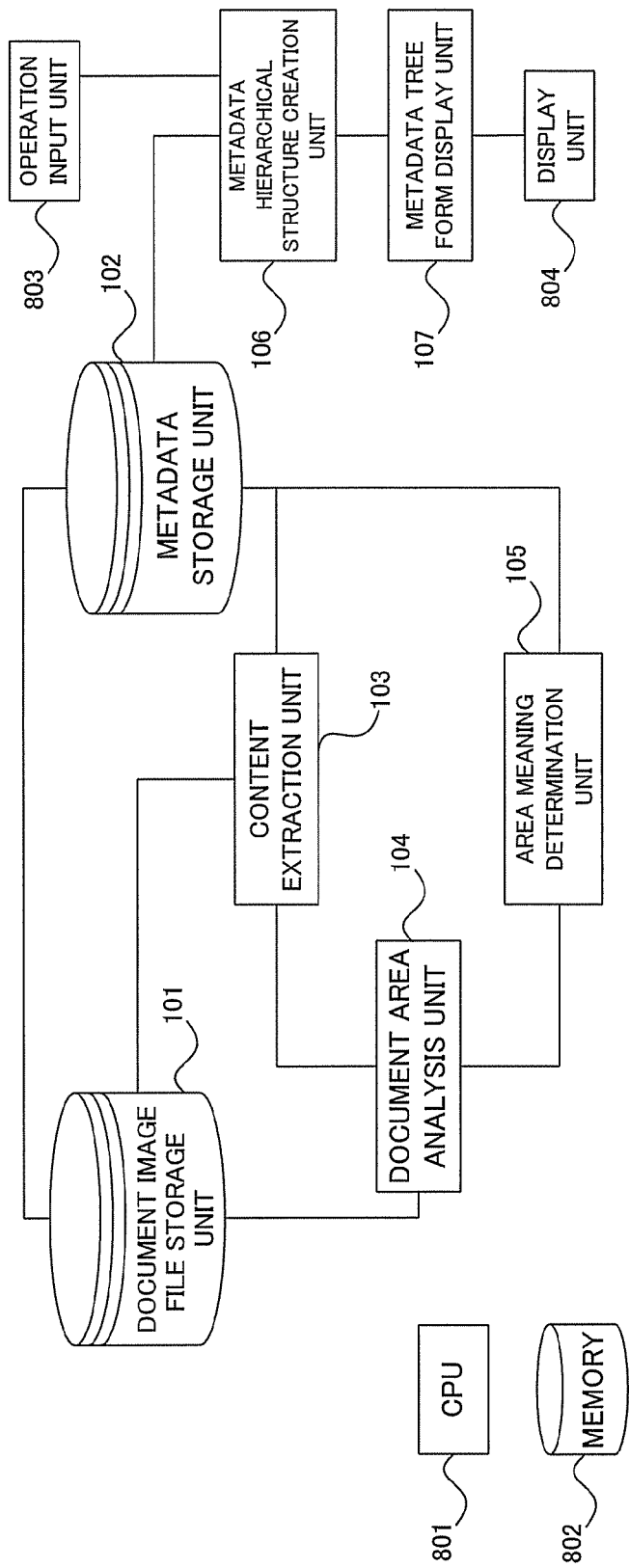
FIG. 1 is a functional block diagram for explaining a document management system according to a first embodiment of the invention.

FIG. 1 is a functional block diagram for explaining a document management system according to the first embodiment of the invention.

As shown in the drawing, the document management system of the embodiment includes a document image file storage unit 101, a metadata storage unit 102, a content extraction unit 103, a document area analysis unit 104, an area meaning determination unit 105, a metadata hierarchical structure creation unit 106, a metadata tree form display unit 107, a CPU 801, a memory 802, an operation unit 803, and a display unit 804.

The document image file storage unit 101 includes, for example, a magnetic disk, and has a function to store a document image file obtained by scanning a paper document.

The metadata storage unit (metadata acquisition unit) 102 includes, for example, a magnetic disk and has a function to store metadata of the respective document image files stored in the document image file storage unit 101.

The content extraction unit 103 has a function to extract the content of the respective areas by extracting image data of the respective areas analyzed by the document area analysis unit 104 or by extracting text data by a character recognition process.

The document area analysis unit 104 (order determination unit, frequency determination unit) has a function to analyze, with respect to a document image file stored in the document image file storage unit 101, an area, such as a character area or a drawing area, in a page image of the document image file and to acquire layout information (position, width, height and the like of each area).

Besides, the document area analysis unit 104 can also determine the appearance order of metadata, which are acquired in the metadata storage unit 102, in a document including the metadata or information relating to the metadata as content. In addition to this, the document area analysis unit 104 can also determine the appearance frequency of arbitrary metadata of plural metadata, which are acquired in the metadata storage unit 102, in the plural metadata.

The area meaning determination unit 105 has a function to determine an area meaning, such as a title, a header, or a main text paragraph, when an area analyzed by the document area analysis unit 104 is a character area, and an area meaning such as appearance order in an image when it is a drawing area.

The metadata hierarchical structure creation unit (hierarchical determination unit) 106 has a function to determine positions (or hierarchies) to which plural metadata are made to correspond in a hierarchically displayed tree structure based on metadata (specifically, for example, priority order of the metadata, dependence relation between the metadata, or the like) stored in the metadata storage unit 102, and to create data for hierarchically displaying the metadata in a tree form.

The metadata tree form display unit 107 has a function to perform expansion or omission of the tree in accordance with an input from the user in the metadata hierarchical structure creation unit 106 and to display the tree form of the metadata to the user.

The CPU 801 has a function to perform various processings in the document management system of the embodiment, and has also a function to realize various functions by executing programs stored in the memory 802. The memory 802 includes, for example, a ROM or a RAM, and has a function to store various information and programs used in the document management system.

The operation input unit 803 has a function as a user interface for receiving an operation input of the user. The display unit 804 is, for example, a liquid crystal display, a CRT display, an EL display or the like, and screen displays information relating to a process to be executed in the document management system.

Incidentally, the metadata hierarchical structure creation unit 106 and the metadata tree form display unit 107 correspond to a display control unit, and have a function to hierarchically display the plural metadata in the tree form on the display unit 804 based on the respective attributes of the plural metadata. The metadata hierarchical structure creation unit 106 and the metadata tree form display unit 107 hierarchically display plural metadata acquired in the metadata storage unit 102 in the tree form based on the determination result in the metadata hierarchical structure creation unit 106.

Figure 2:
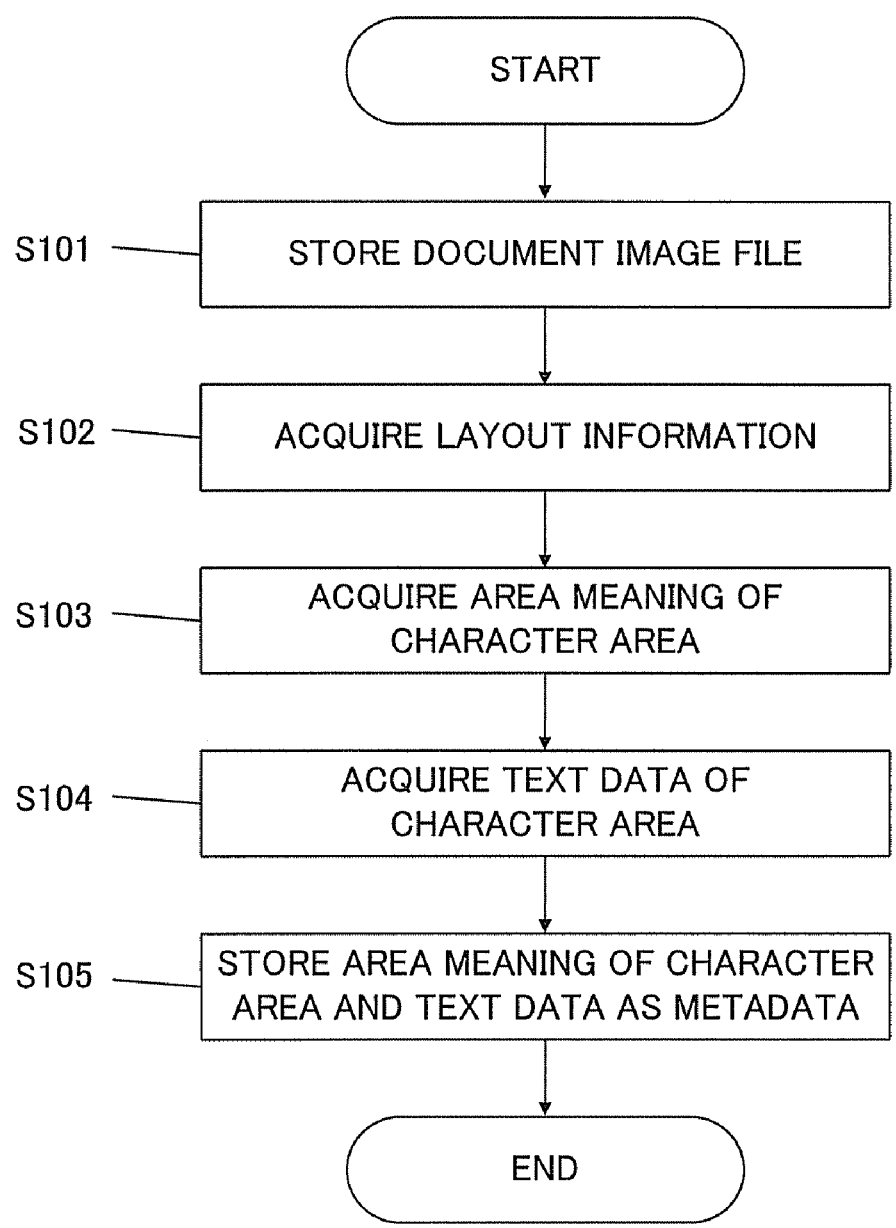
FIG. 2 is a flowchart showing a flow of a process in the document management system according to the first embodiment of the invention.

FIG. 2 is a flowchart showing a flow of a process in the document management system according to the first embodiment of the invention.

In the document management system of the embodiment, the process as described below is performed on a document image file obtained by scanning an original document transported by an ADF (Auto Document Feeder).

First, at S101, a document image file as a management object acquired as stated above is stored in the document image file storage unit 101. Here, in the case where a paper document of plural pages are scanned by the ADF and the like, plural page images are arranged into one document image file and are stored. When the document image file is stored in the document image file storage unit 101, the metadata storage unit 102 acquires context data, such as a file name of a document as a management object, a file creation date, a scan place (file creation place of the document), and a scan operator, as metadata and stores them. Besides, the metadata storage unit 102 can also acquire, as the metadata, setting content set in the file of the document, text information extracted from the content of the document, layout information of the display object in the page of the document, and the like.

Next, at S102, the document area analysis unit 104 analyzes layout information of a character area and a drawing area in the page image with respect to each of the page images included in the document image file. The document area analysis unit 104 acquires, as the layout information, for example, information relating to the coordinate of a left upper point of a rectangle surrounding the character area or the drawing area, and the width and height of the rectangle. However, in the case where the plural page images are included in the document image file, the analysis object of the layout information is limited to the page image of one page included in the document image file. Specifically, the document area analysis unit 104 analyzes the layout information of only the first page image in the document image file including plural pages, for example.

Next, at S103, based on the layout information of the character area analyzed by the document area analysis unit 104, the area meaning determination unit 105 determines the area meaning of the character area. Area meanings include "title", "subtitle", "header", "footer", "text,", "subheading" and the like. These area meanings can be determined by such a method that for example, when the position of a character area is an upper part of the page image, and the height of the character area is large, the area meaning of the character area is "title".

Besides, the area meaning may be determined by such a method that a page image of a repetitive document is made an object, such information that "in the case where there is a character area having a certain position, width, and height in a page image, the area meaning of the character area is "author"" is previously prepared, this information is compared with the layout information of the page image actually obtained by the document area analysis unit 104, and when there is a character area coincident with the prepared information, the area meaning of the character area is determined to be "author".

Next, at S104, the content extraction unit 103 performs a character recognition process on the character area to which the area meaning is given by the area meaning determination unit 105, and extracts text data from each area as content.

Next, at S105, the text extracted by the content extraction unit 103 is stored as the metadata in the metadata storage unit 102. For example, in the case where the text data of "regular meeting material" is extracted by the content extraction unit 103 from the area analyzed by the area meaning determination unit 105 such that the area meaning is "title", information ["title" is "regular meeting material"] is stored as metadata of the document image file in the metadata storage unit 102.

Incidentally, in this embodiment, although the example has been described in which the character recognition process is performed on the character area to acquire the text data, and the text data is made the metadata, in addition to this, the image data of the character area may be directly stored as the metadata without performing the character recognition process.

By the above method, the document image file obtained by scanning and the metadata of the document image file are stored in the document image file storage unit 101 and the metadata storage unit 102. Incidentally, in this embodiment, although the metadata is stored in the metadata storage unit 102 separately from the document image file storage unit 101 in which the document image file is stored, the metadata may be embedded in the document image file and may be stored.

Next, a description will be given to a flow of a process at the time when the document image file stored in the document management system of the embodiment is presented to the user.

First, the metadata held by the respective document image file stored in the document image file storage unit 101 are acquired by the metadata storage unit 102, and the metadata are arranged in the tree form by the metadata hierarchical structure creation unit 106. The metadata hierarchical structure creation unit 106 creates information to regulate the tree form based on the information such as priority order and dependence relation of the metadata.

FIG. 3 is a view showing an example of a document image file having a page image as a management object in the embodiment.

FIG. 4 is a view showing an example of data content, such as a file name, a file creation date, and a scan place, as metadata stored in the metadata storage unit 102.

FIG. 5 is a view showing an example of a data table for storing content metadata extracted by the area meaning determination unit 105 and the content extraction unit 103. The data table includes items of "title", "header" and the like, and they are paired with text data and are stored in the metadata storage unit 102. As shown in the drawing, the determination result relating to the appearance order, in the page, of the metadata in the document area analysis unit 104 is reflected in, for example, the positions of the respective metadata in the data table. That is, metadata positioned at the upper side in the page is positioned at the upper side also in the data table shown in FIG. 5. Also in the hierarchical structure of the tree form displayed based on the information stored in the data table, this order is reflected.

In addition to this, the determination result relating to the appearance frequency of the metadata in the document area analysis unit 104 is reflected in the positions of the respective metadata in the data table. For example, metadata with a high appearance frequency in a document image file can be positioned at the upper side in the data table as shown in FIG. 5. By this, this order is reflected also in the display order of the respective metadata in the hierarchical structure of the tree form displayed based on the information stored in this data table (metadata with a high appearance frequency is displayed at an upper level among metadata belonging to a hierarchy to which the metadata belongs).

By this, also in the hierarchical structure displayed in the tree form, the user can make a retrieval based on the memory relating to the arrangement of the respective metadata in the page, and the management efficiency of the document image file can be further improved.

Figure 6:
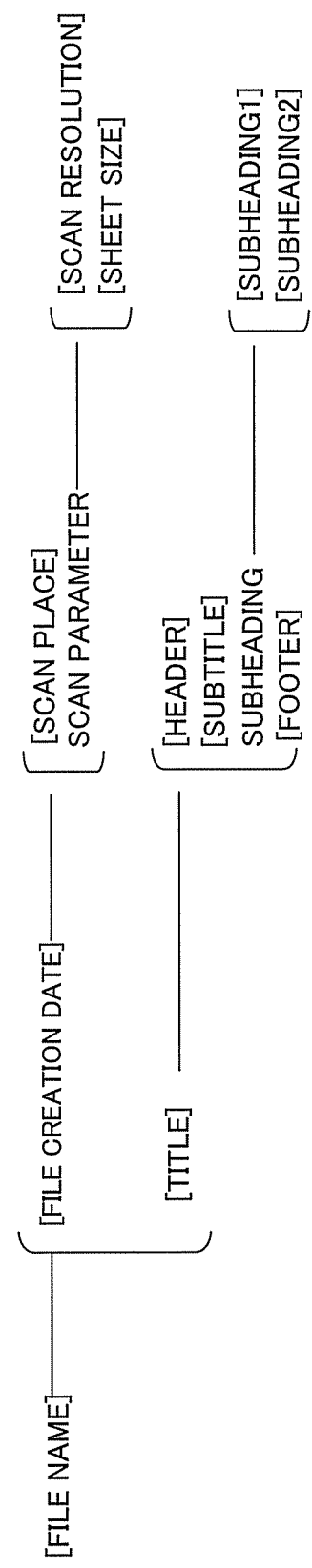
FIG. 6 is a view showing a tree form in which metadata acquired from a document image file are hierarchically displayed in a tree.

FIG. 6 is a view showing a tree form when the metadata acquired from the document image file are hierarchically displayed in the tree. The metadata hierarchical structure creation unit 106 arranges the context metadata and content metadata in the tree form as shown in FIG. 6.

In this embodiment, an example is shown in which the file name of the document image file is used as the root item of the tree, and the file creation date and the title are used as lower items thereof. Further, information of a scan place and information of a scan parameter are used as the lower items of the file creation date.

Figure 7:
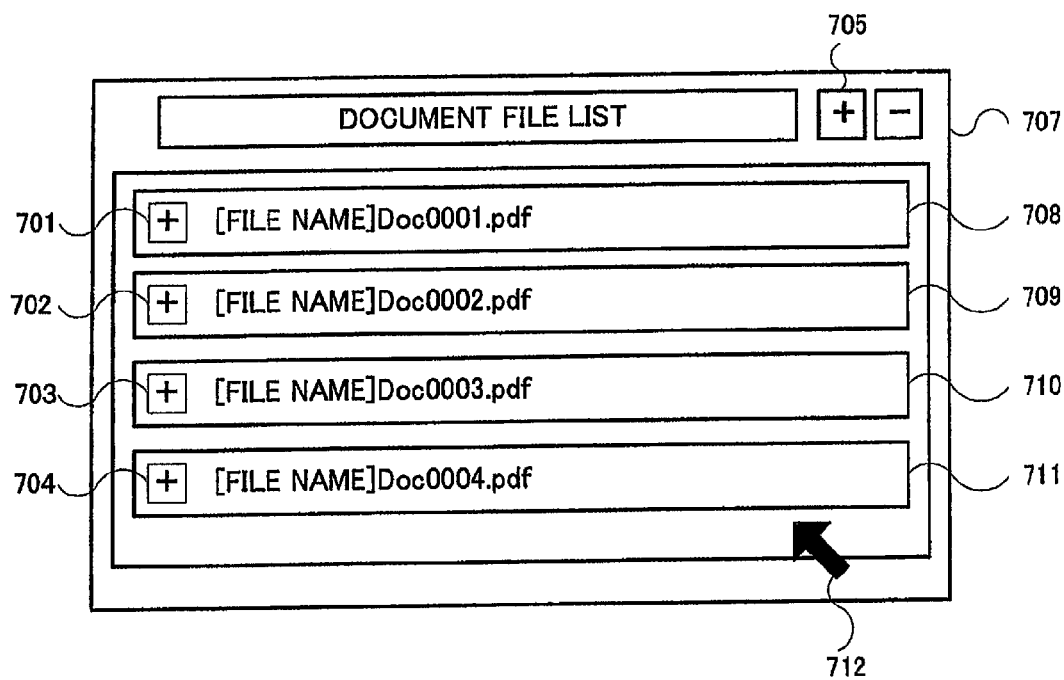
FIG. 7 is a view showing an example of a GUI screen displayed on a display unit 804.
Figure 8:
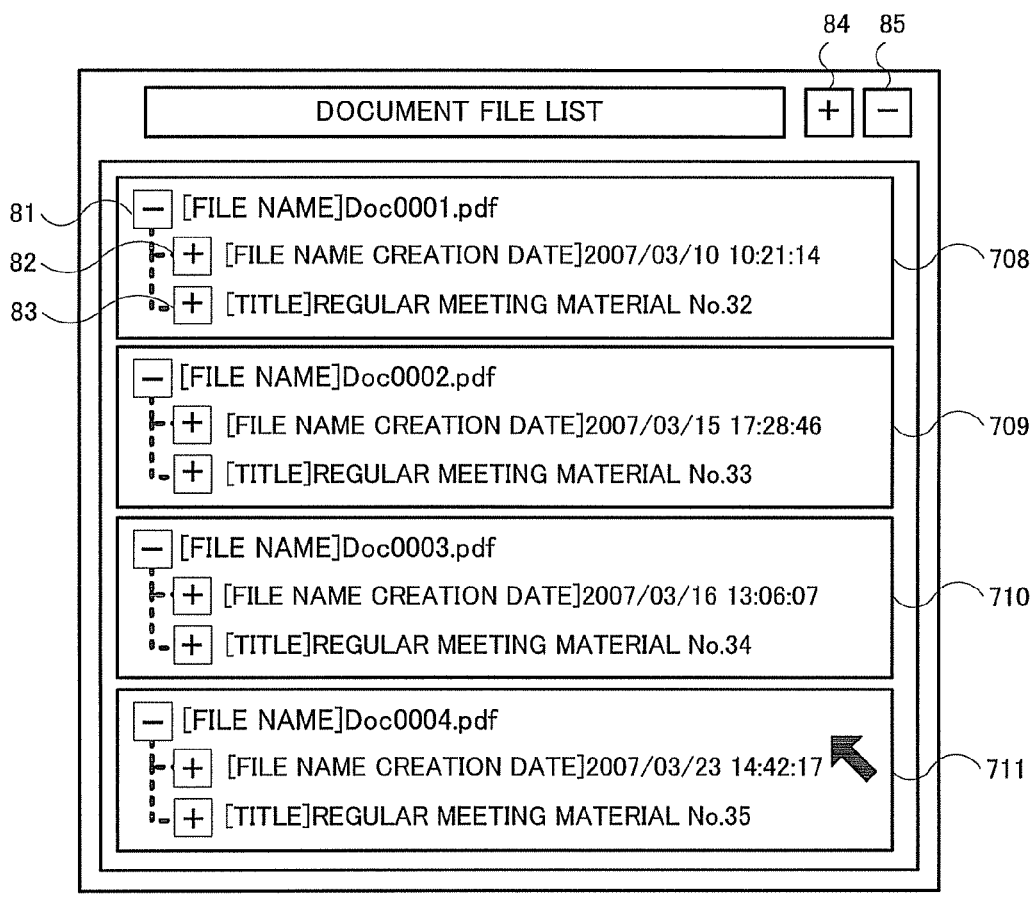
FIG. 8 is a view showing a state in which a tree shown in FIG. 7 is expanded.

Next, the tree created based on the metadata of the respective document image files by the metadata hierarchical structure creation unit 106 is presented as the list of the tree form to the user by the metadata tree form display unit 107. FIG. 7 is a view showing an example of a GUI screen displayed on the display unit 804. In FIG. 7, as an example, file names of four document image files as management objects are made to correspond to display areas 708, 709, 710 and 711 and are displayed. Here, the file name displayed in the display area is the root item of the tree. On the GUI screen shown in the drawing, when the user operates a pointer 712 by an operation input to the operation input unit 803 and clicks expansion buttons 701, 702, 703 and 704, the tree of each of the document image file items is expanded. FIG. 8 is a view showing a state in which the tree shown in FIG. 7 is expanded to a hierarchy one level lower.

Figure 9:
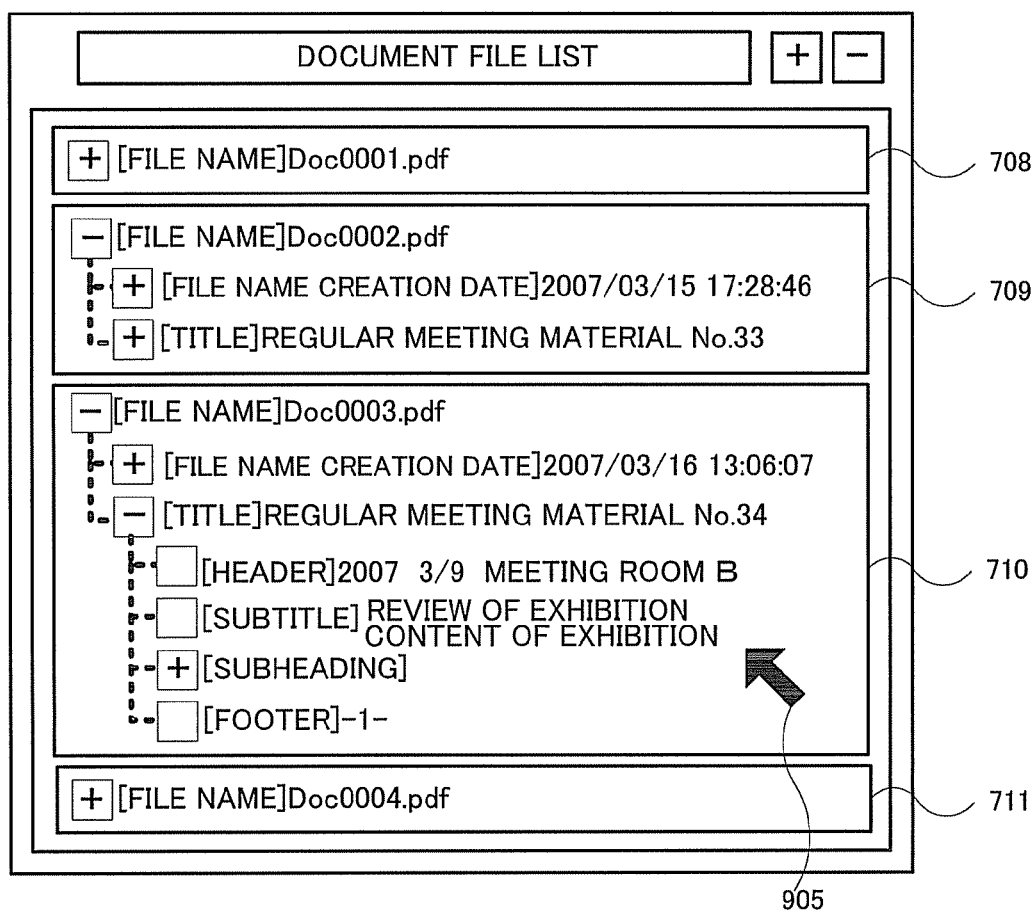
FIG. 9 is a view showing a display example of a case where expansion or omission (folding) of an item is performed for each document image file.

As shown in FIG. 8, by clicking the expansion buttons 705 as stated above, the tree of each of the document image file items is expanded from the root by one stage, and information of "file creation date" and "title" as items belonging to the hierarchy one level lower than the root is displayed. When the user further clicks an expansion button 84 in the state shown in FIG. 8, information of "scan place", "header", "subtitle" and the like as items belonging to a hierarchy further lower than the lowest hierarchy of the tree display at that time point are expanded and displayed. Besides, the user clicks an omission button 85, the information of the "file creation date" and "title" expanded and displayed is omitted, and a return is made to the display state shown in FIG. 7. Besides, by clicking an omission button 81, an expansion button 82, an expansion button 83 and the like, the display of items corresponding to these buttons can be omitted (folded) or expanded. FIG. 9 is a view showing a display example of a case where expansion or omission (folding) of an item is performed for each of the document image files.

As stated above, according to this embodiment, when plural document image files as management objects are listed and displayed, the metadata as indexes used for determining the contents of the displayed document image file are displayed in the tree form in which expansion and omission can be performed, so that only information whose display is necessary for the user can be displayed. As stated above, the structure is made such that only the necessary and sufficient amount of information is screen displayed in the tree form, so that the display space on the display unit 804 can be effectively used, and a contribution can be made to a reduction in management load of document image files.

(Second Embodiment)

Next, a second embodiment of the invention will be described. This embodiment is a modified example of the first embodiment. Hereinafter, in this embodiment, a portion having the same function as a portion explained in the foregoing embodiment is denoted by the same reference numeral and its explanation will be omitted.

Figure 10:
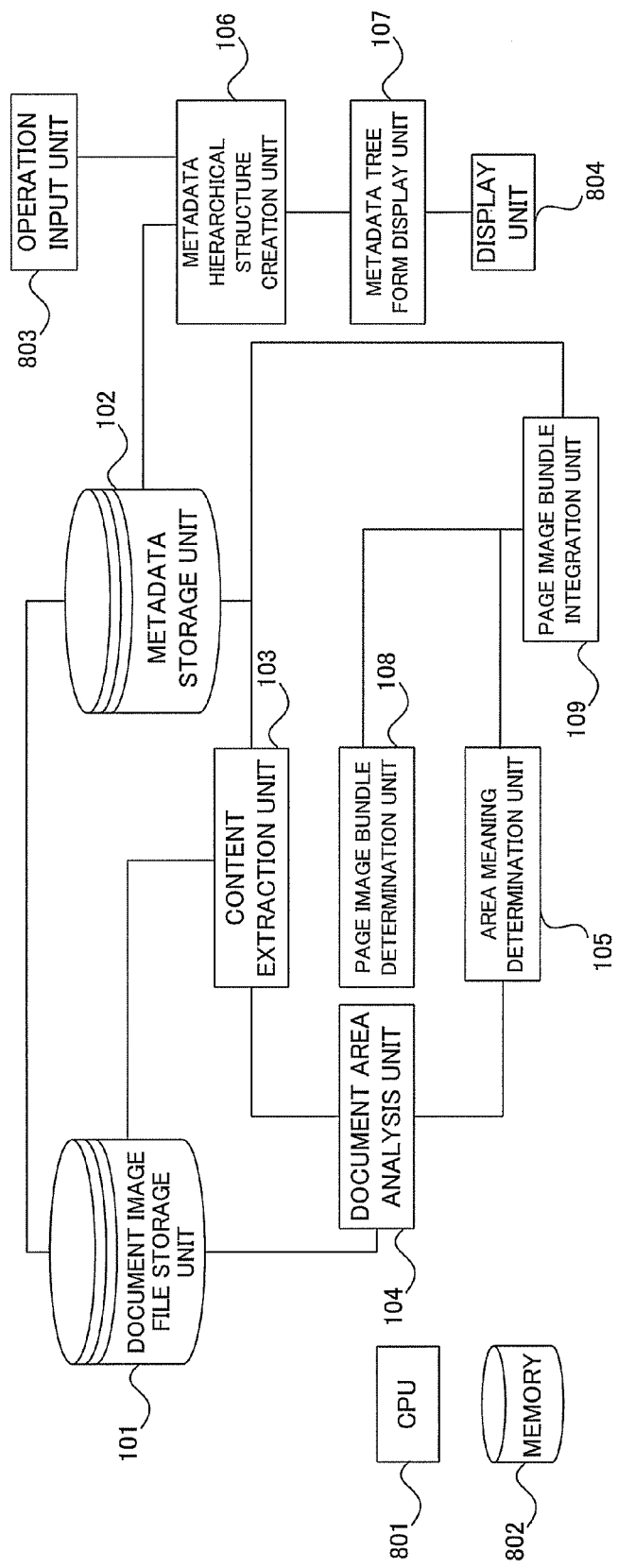
FIG. 10 is a functional block diagram of a document management system according to a second embodiment of the invention.

FIG. 10 is a functional block diagram of a document management system according to the second embodiment.

In the second embodiment of the invention, in addition to the structure of the document management system according to the first embodiment, a page image bundle determination unit 108 and a page image bundle integration unit 109 are further provided.

With respect to a document image file stored in a document image file storage unit 101, in the case where the document image file includes plural page images, the page image bundle determination unit 108 determines a bundle of page images based on layout information, area meaning and content of a character area and a drawing area obtained from each page.

The page image bundle integration unit 109 has a function to integrate and arrange area meanings extracted from all page images constituting the document image file for each bundle of page images.

Figure 13:
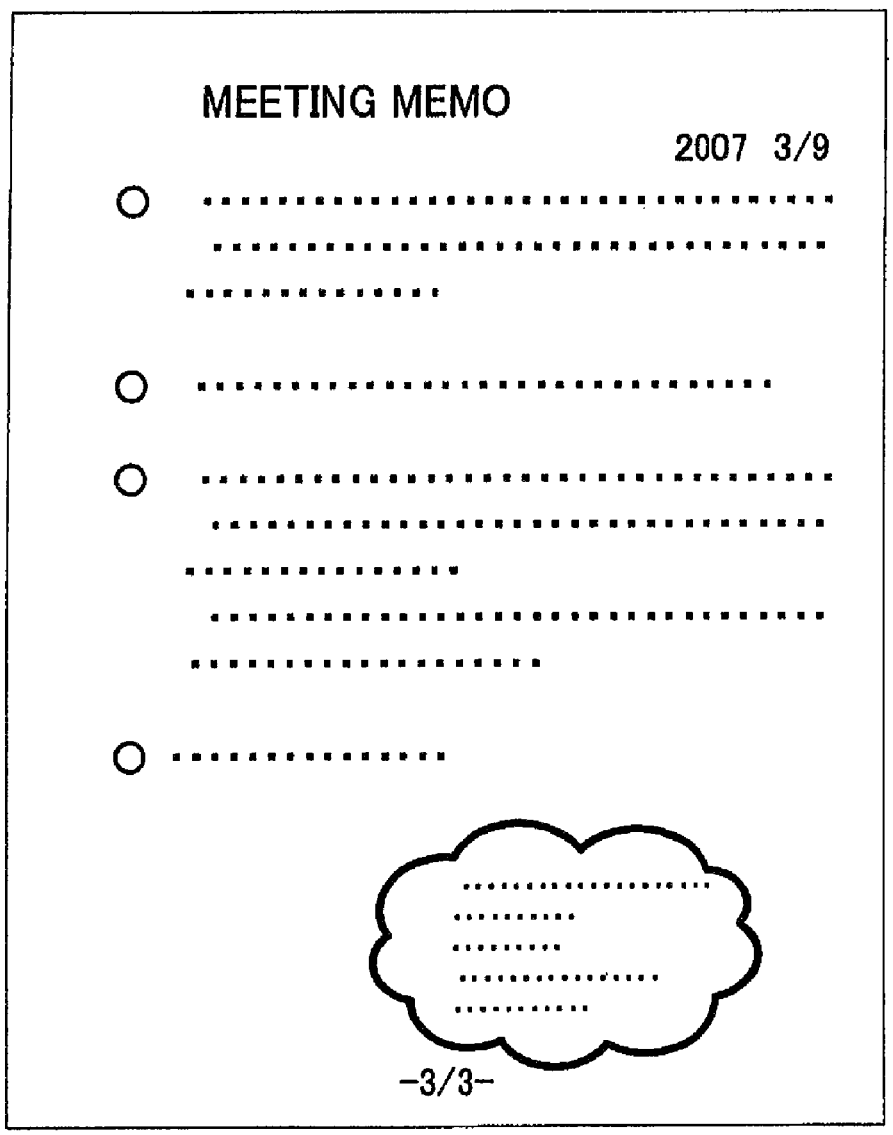
FIG. 13 is a view showing an example of a third page image included in the document image file.
Figure 14:
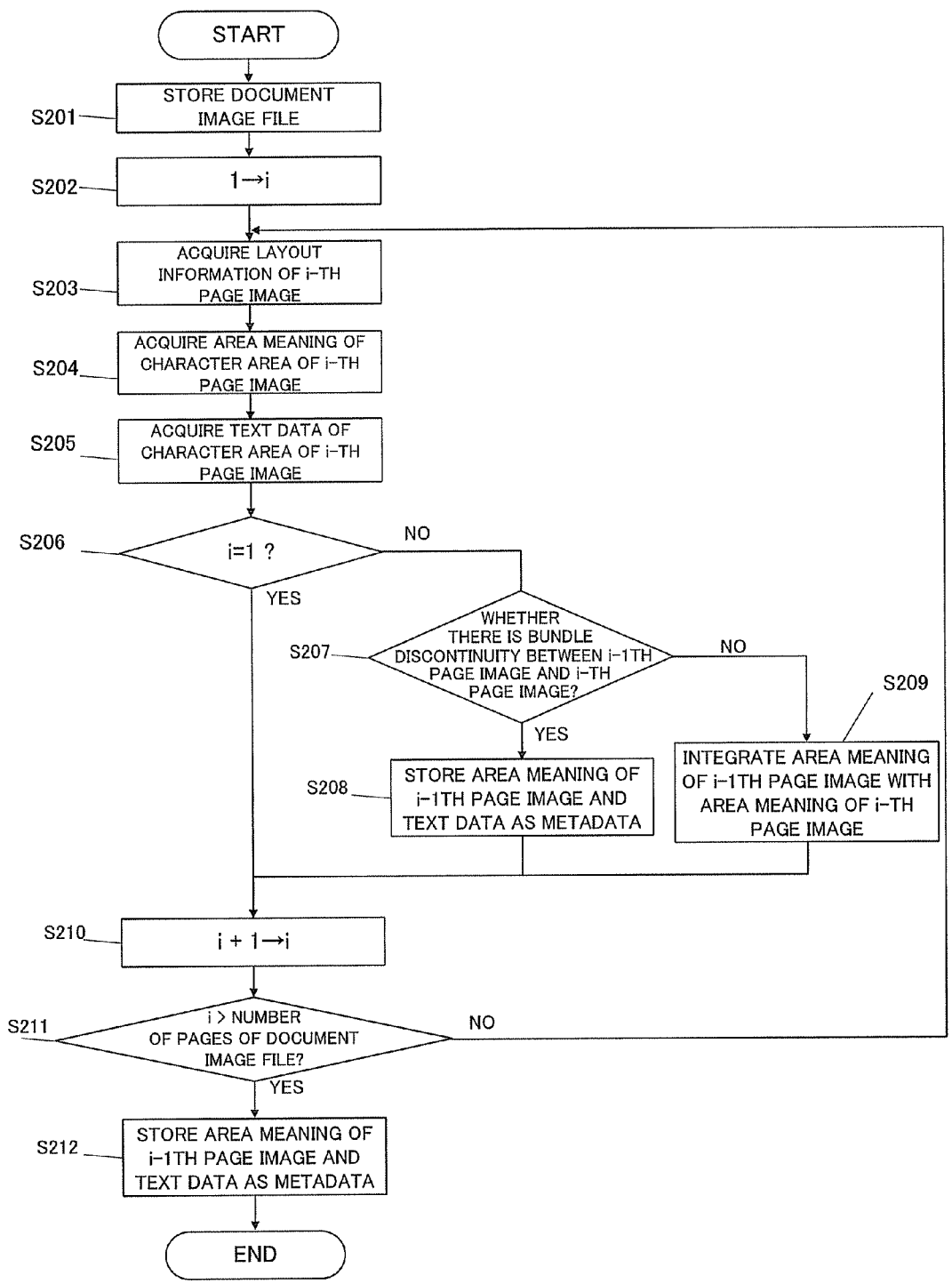
FIG. 14 is a flowchart showing a flow of a process in the document management system according to the second embodiment of the invention.

FIG. 14 is a flowchart showing a flow of a process of a case where a paper document including three pages shown in FIG. 11, FIG. 12 and FIG. 13 is inputted as a document image file in the document management system according to the second embodiment of the invention.

First, at S201, the inputted paper document is stored as the document image file by the document image file storage unit 101. Besides, when the document image file is stored by the document image file storage unit 101, context data such as a file name, a file creation date, a scan place and a scan operator are stored as metadata in the metadata storage unit 102. At S202, a variable i is set to 1.

Next, at S203, the document area analysis unit 104 acquires layout information of a character area and a drawing area from the first page image shown in FIG. 11.

Next, at S204, the area meaning determination unit 105 acquires the area meaning of the character area from the first page image.

Next, at S205, with respect to the first page image, the content extraction unit 103 acquires text data from the character area to which the area meaning is given by the area meaning determination unit 105. FIG. 15 shows an example of the area meanings of the character areas as metadata acquired from the first page image at S204 and S205 and text data thereof.

Next, the process is performed at S206 and S210, and the process is performed on the second page image shown in FIG. 12. At S203, S204 and S205, similarly to the above process, layout information, area meaning, and text data are acquired from the second page image. FIG. 16 shows an example of area meanings of character areas as metadata acquired from the second page image at S204 and S205 and text data thereof.

In a document image file including plural page images, like a chaptered document, there is a case where, for example, a form is different for every plural pages. Then, at S207, the page image bundle determination unit 108 determines whether there is a page bundle discontinuity (a parting between page bundles having content different from each other) between the first page image and the second page image. The determination of the page bundle discontinuity is performed by comparing layout information, area meaning, and text data extracted from two adjacent pages. Here, since the two adjacent pages include the headers having the same position and the same text data, and the page numbers written in the footers are continuous, it is determined that there is no bundle discontinuity, and the contents of these pages are continuous, and advance is made to S209.

At S209, the page image bundle integration unit 109 integrates and arranges the area meanings of the first page image and the area meanings of the second page image. Since it is determined that there is no bundle discontinuity between the first page image and the second page image, and they are continuous, metadata common to the first page and the second page are integrated. Here, since the text data of the header are common to the two pages, the page image bundle integration unit 109 integrates these.

By this, based on metadata acquired in common among plural page images by the metadata storage unit 102, the display control unit can group the page images from which the metadata are acquired and display them.

Next, at S210, a process is performed on the third page image shown in FIG. 13. At S203, S204 and S205, layout information, area meaning, and text data are acquired from the third page image. FIG. 17 shows area meanings of character areas as metadata acquired from the third page image at S204 and S205 and text data thereof.

Next, at S207, the page image bundle determination unit 108 determines whether there is a page bundle discontinuity between the second page image and the third page image. Since there is no common header or no continuous footer page numbers in the second page image and the third page image, it is determined that there is a bundle discontinuity and there is a bundle different from the bundle including the first page image and the second page image, and advance is made to S208.

Next, at S208, the metadata storage unit 102 stores the area meanings integrated at S209 as metadata.

Next, the process is performed at S210 and S211, and after the process is performed on all page images, advance is made to S212.

At S212, the metadata storage unit 102 stores the area meanings and the text data of the character areas of the third page image as the metadata.

FIG. 18 is a view showing the metadata acquired from the page images of the document image file and finally stored in the metadata storage unit 102. An identification number indicating that the acquired metadata is included in which page bundle is assigned to the acquired metadata as a bundle number. That is, the bundle number 1 is assigned to the metadata acquired from the first page image, which is the first page bundle, and the second page image, and the bundle number 2 is assigned to the metadata acquired from the third page image.

Next, a description will be given to a process of a system at the time when document image files stored in the document management system are presented to the user.

Figure 19:
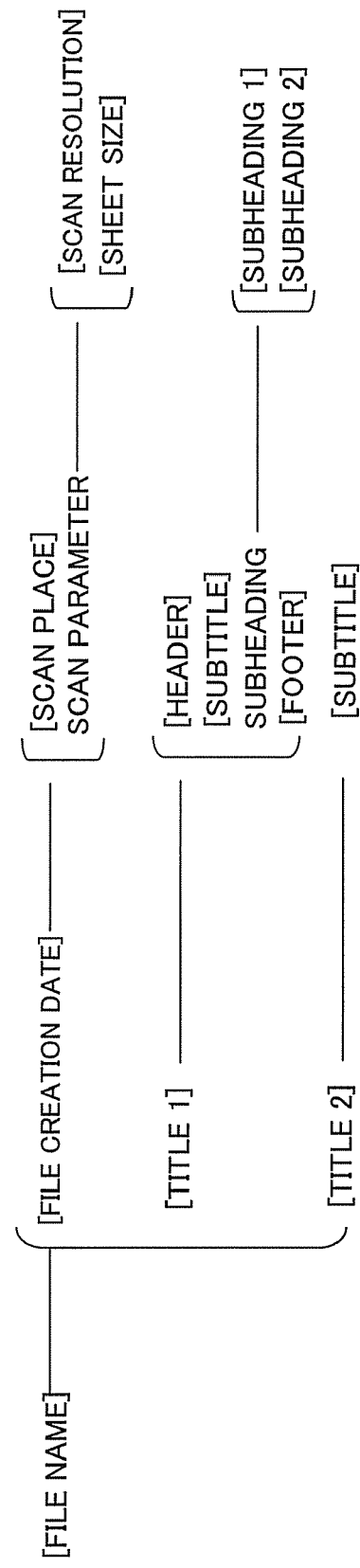
FIG. 19 is a view exemplifying metadata acquired from a document image file and expressed in a tree form.

First, the metadata hierarchical structure creation unit 106 acquires metadata corresponding to the respective document image files stored in the document image file storage unit 101 from the metadata storage unit 102, and arranges the metadata into a tree form similarly to the first embodiment. FIG. 19 is a view showing the metadata acquired from the document image files and expressed in the tree form.

Figure 20:
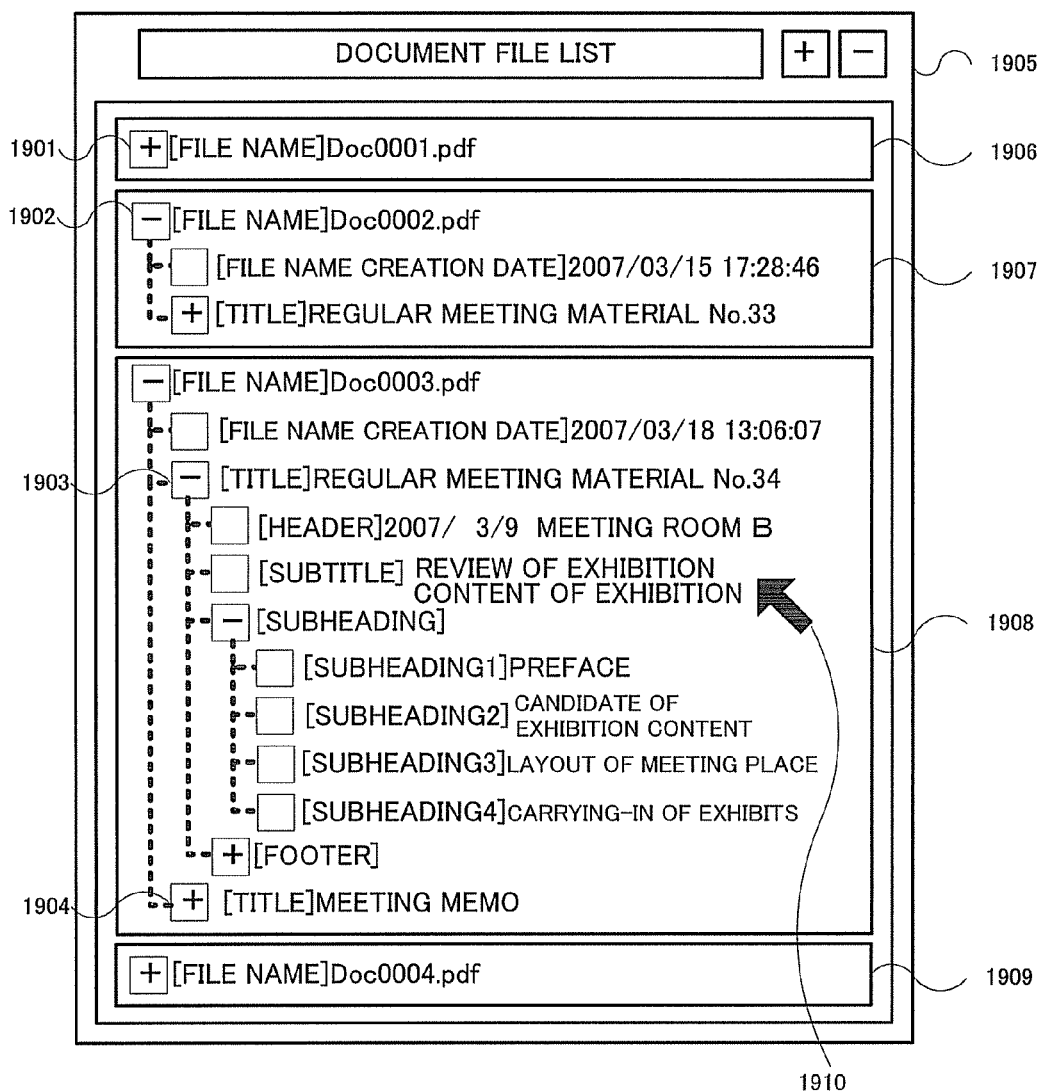
FIG. 20 is a view showing an example of a document image file browsing GUI presented to a user.

Next, the information in which the metadata are arranged in the tree form is screen displayed to the user on the display unit 804 as a list of the tree form by the metadata tree form display unit 107. FIG. 20 is a view showing an example of a document image file browsing GUI presented to the user.

In FIG. 20, similarly to the case of the first embodiment, file names of four document image files stored in the document image file storage unit 101 are made to correspond to areas 1901, 1902, 1903 and 1904 and are displayed. That is, the root item of the tree of each item is the file name. When the user operates a pointer 1910 by an operation input to the operation input unit 803 and clicks an expansion button 1901, a lower hierarchy in the tree is expanded and displayed, and items belonging to the expanded hierarchy is displayed.

Here, as the items belonging to the lower hierarchy, "file creation date" and "title" of plural page bundles included in the document image file are exemplified. For example, the document image file made to correspond to an area 1908 and displayed includes a bundle of the first and the second page images and a bundle of the third page image, and the highest items of the respective page bundles are "title" of the page bundles respectively shown in the area 1903 and the area 1904. When the item of "title" is expansion by the operation input of the user, "header", "subtitle" and the like as items belonging to the lower hierarchy are displayed.

As stated above, according to the second embodiment of the invention, even in the case where plural kinds of paper documents are mixed and are inputted to the document management system, the metadata included in the document image file are arranged for each page bundle, and it is possible to present to the user what page bundles are included in the one file. By this, it becomes easy for the user to grasp the attributes of the respective page images included in the document file, and a contribution can be made to the improvement of management efficiency of the document image file.

(Third Embodiment)

Next, a third embodiment of the invention will be described. This embodiment is a modified example of the foregoing embodiment. Hereinafter, a portion having the same function as a portion explained in the foregoing embodiment is denoted by the same reference numeral and its explanation will be omitted.

Figure 21:
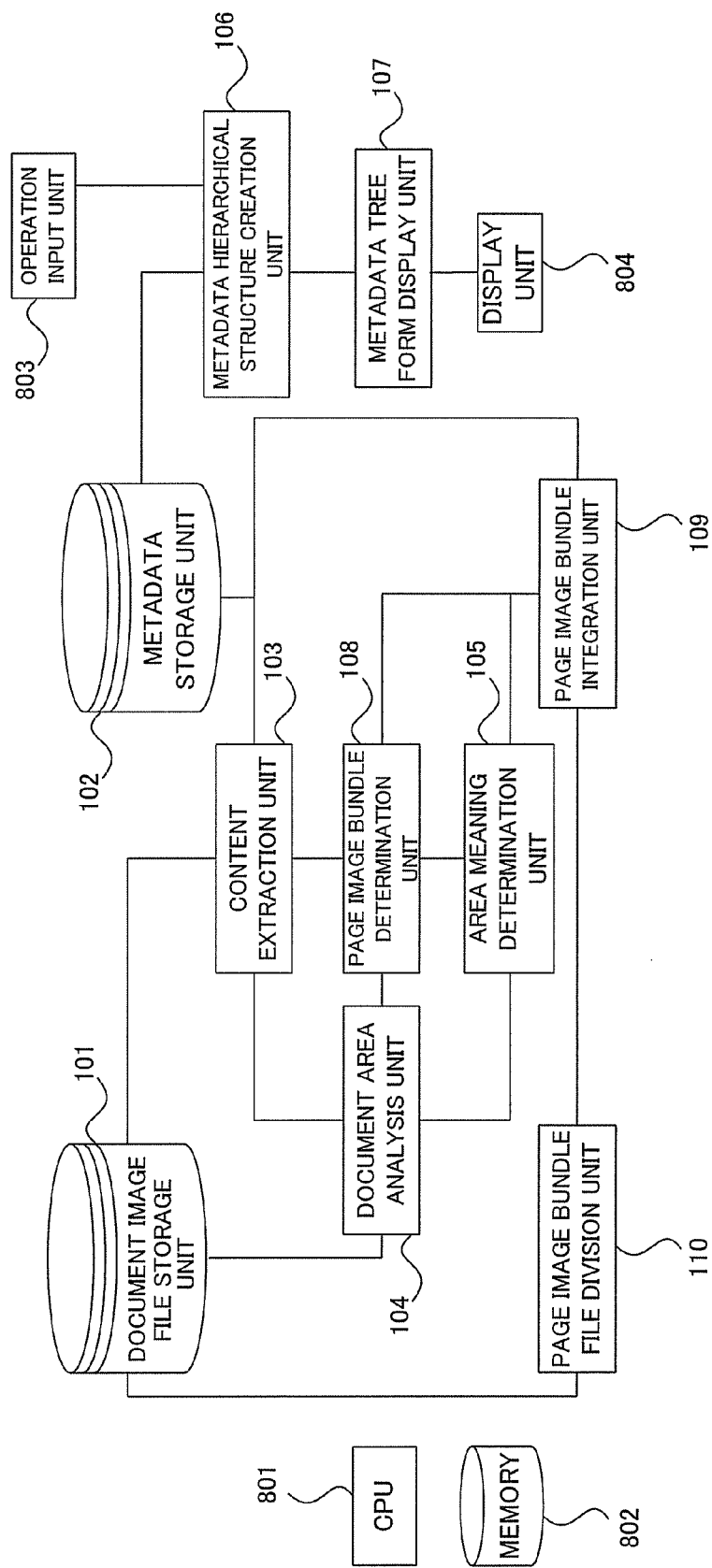
FIG. 21 is a functional block diagram showing a structure of a document management system according to a third embodiment of the invention.

FIG. 21 is a functional block diagram showing a structure of a document management system according to the third embodiment of the invention.

The third embodiment of the invention has such a structure that a page image bundle file division unit 110 is further provided in addition to the structure of the second embodiment.

The page image bundle file division unit 110 has a function to divide a document image file for each page image bundle determined by a page image bundle determination unit 108 and to store it in a document image file storage unit 101.

In the document management system of this embodiment, similarly to the document management system of the second embodiment, in the case where a document image file in which plural page images are mixed is stored in the document image file storage unit 101, the page image bundle determination unit 108 and the page image bundle integration unit 109 are used and determined a page bundle.

Further, when a page bundle discontinuity is recognized by the page image bundle determination unit 108, the page image bundle file division unit 110 creates new document image files by dividing the document image file at the page bundle discontinuity.

As stated above, according to the third embodiment of the invention, even in the case where plural kinds of paper documents are mixed and are inputted to the document management system, they are separated into document image files arranged for each page bundle, area meanings of character areas included in the respective document image files are arranged, and they can be displayed to the user in an easily understood manner. By this, a contribution can be made to the improvement of management efficiency of the document image file.

(Fourth Embodiment)

Next, a fourth embodiment of the invention will be described. This embodiment is a modified example of the foregoing embodiment. Hereinafter, a portion having the same function as a portion explained in the foregoing embodiment is denoted by the same reference numeral and its explanation will be omitted.

Figure 22:
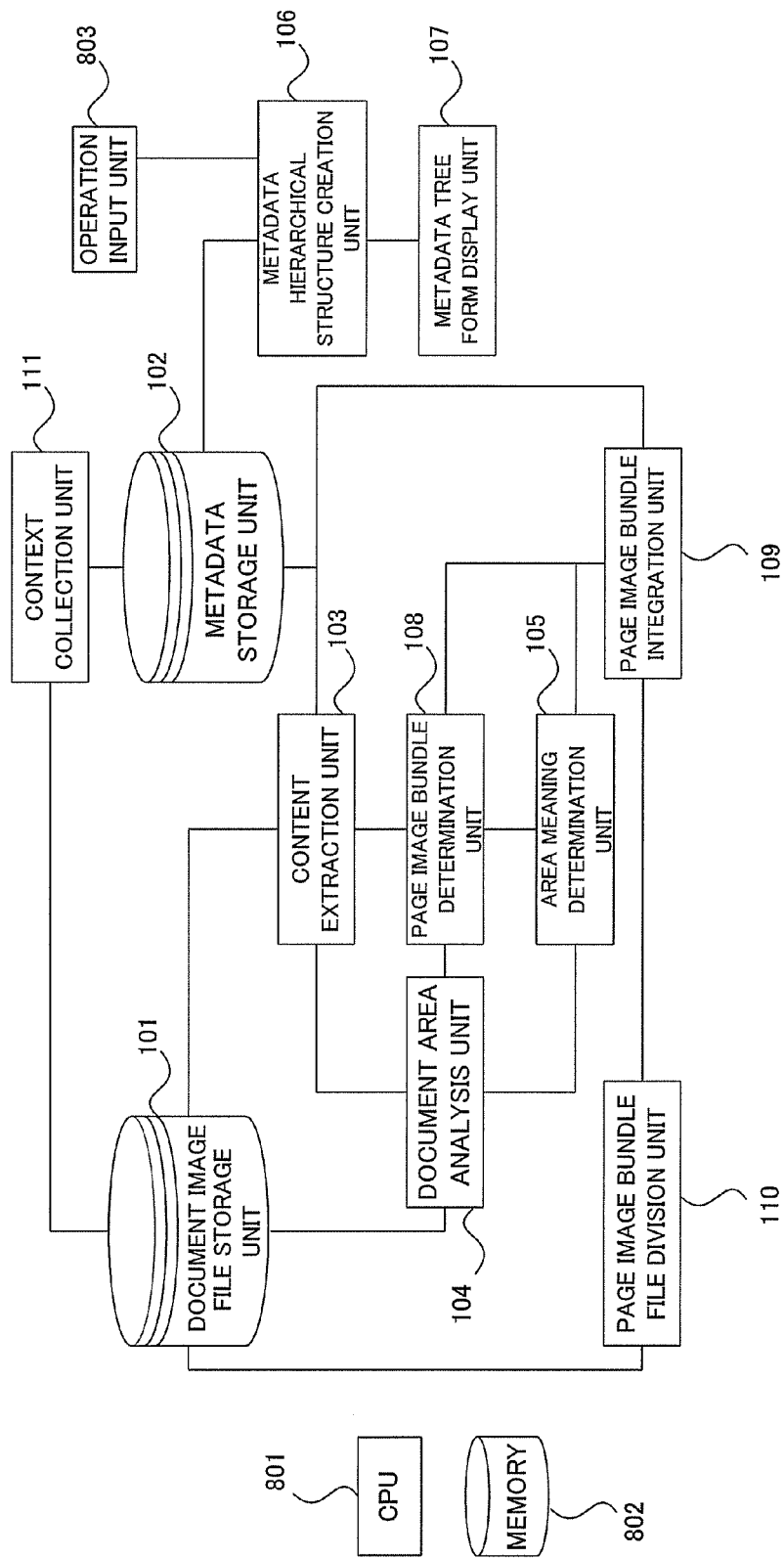
FIG. 22 is a functional block diagram showing a structure of a document management system according to a fourth embodiment of the invention.

FIG. 22 is a functional block diagram showing a structure of a document management system according to the fourth embodiment of the invention.

The fourth embodiment of the invention has such a structure that a context collection unit 111 is further provided in addition to the structure of the document management system of the third embodiment.

Specifically, the context collection unit 111 has a function to collect context metadata relating to document image files stored in the document image file storage unit 101 and to store them in the metadata storage unit 102.

In the document management system according to the fourth embodiment of the invention, when a document image file obtained by scanning of a not-shown image reading apparatus is stored in the document image file storage unit 101, context data relating to the document image file 4 is collected by the context collection unit 111, and is stored as metadata in the metadata storage unit 102.

For example, in the case where a document image file is created by scanning at 14:37:22 of Mar. 11, 2007 in a meeting room A, the context collection unit 111 accesses schedule data of meeting rooms stored in an outside scheduler or the like, and retrieves meeting schedules conducted approximately at 14:37:22 of Mar. 11, 2007. In the case where the relevant schedule is retrieved, the name of the meeting schedule, such as "intellectual property meeting", is acquired from the outside scheduler, and stores it as context metadata in the metadata storage unit 102 while an item of a document image file schedule name is used. Of course, the context collection unit 111 can also store information of a meeting participant as metadata in addition to the above. Besides, the context collection unit 111 not only acquires the metadata from the outside schedule but also can collect other various data as metadata.

As stated above, after the context collection unit 111 collects the context metadata, similarly to the third embodiment, a process is performed on the document image file.

Figure 23:
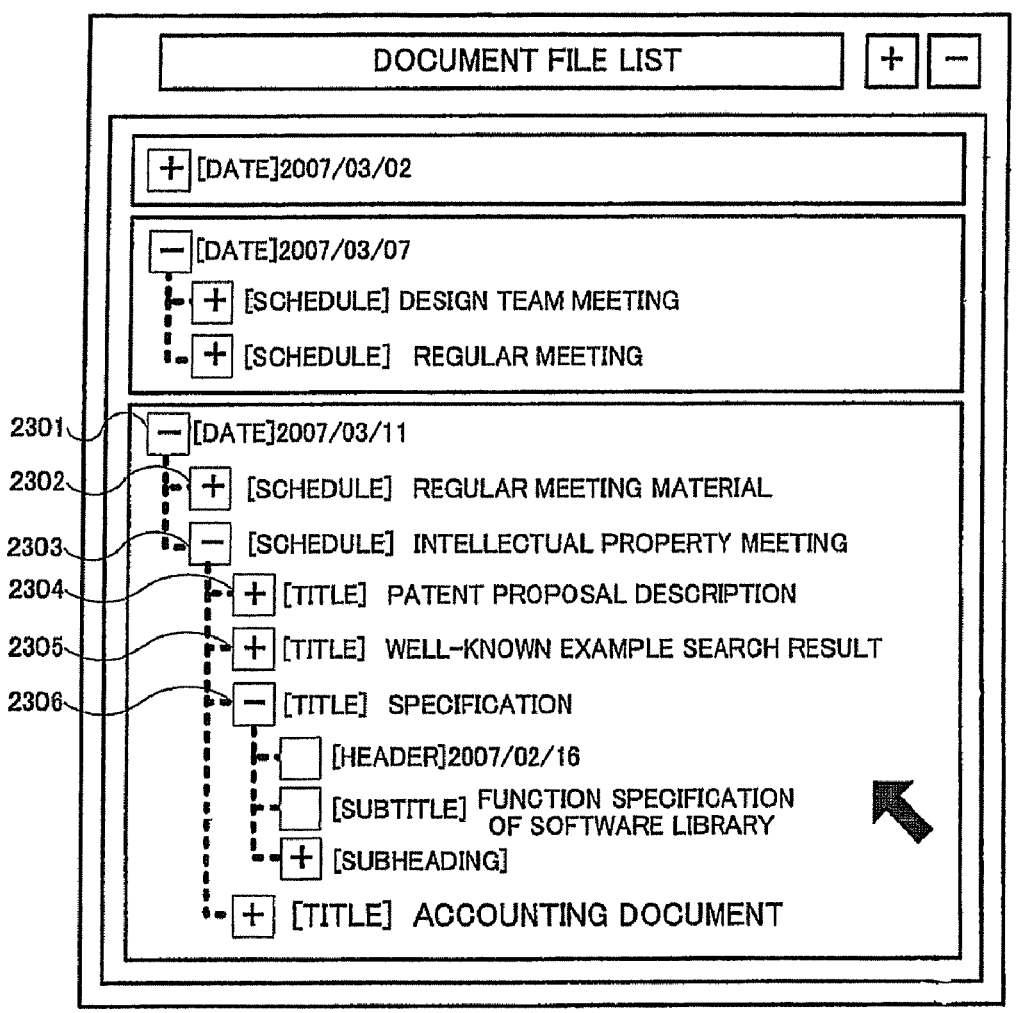
FIG. 23 is a view showing a screen display example on a display unit 804 in the fourth embodiment of the invention.

FIG. 23 is a view showing a screen display example on the display unit 804 in the fourth embodiment of the invention. By using the context metadata collected by the context collection unit 111, when the document image file is displayed with a list in a tree form by the metadata hierarchical structure creation unit 106 and the metadata tree form display unit 107, the screen display as shown in the drawing can be performed.

In FIG. 23, as the root item of the tree to express each of the document image files, the date of the context data is made to correspond to an omission button 2301 and is displayed. As the lower item, schedule names are made to correspond to an expansion button 2302 and an omission button 2303.

The user traces the date and the schedule name in sequence, and can find out a desired document image file. At items belonging to a hierarchy just under the schedule name made to correspond to an omission button 2303, document image files with the date of Mar. 11, 2007 and the schedule name of "intellectual property meeting" are displayed, however, since the document image files are separated in a unit of a bundle by the page image bundle file division unit 110, the "title" names, not the file names of the document image files, are displayed which are made to correspond to an expansion button 2304, an expansion button 2305, and an omission button 2306 and are shown. Further, at items belonging to a hierarchy lower than that, information of "subtitle" "header" and the like are displayed.

As stated above, according to the fourth embodiment of the invention, the context information relating to the document image files are collected, and the context information are arranged in the tree form and are displayed, so that the presented context information can be hierarchically traced, and the document image file desired by the user can be easily found out.

Incidentally, in the foregoing embodiment, although the example has been described in which in each tree made to correspond to each metadata (for example, the file name or date) having a specified attribute included in plural metadata acquired by the metadata storage unit 102, metadata made to correspond to each tree and the relevant metadata are hierarchically displayed, it is not always necessary that the attribute as a reference for distinguishing between the respective trees is fixed to one.

That is, in each tree made to correspond to each metadata having an attribute (for example, a file name or a date) arbitrarily selected by an operation input to the operation input unit 803 among plural metadata acquired by the metadata storage unit 102, the display control unit may hierarchically display the metadata made to correspond to each tree and the relevant metadata. By this, the user can make a change to a display with plural trees classified based on desired metadata (the desired metadata is made to correspond to the root of the tree).

The respective steps in the process executed in the document management system of the foregoing respective embodiments are realized by causing the CPU 801 to execute a document management program stored in the memory 802.

In the embodiment, although the description has been given to the case where the functions to carry out the invention are previously recorded in the inside of the apparatus, no limitation is made to this, and similar functions may be downloaded to the apparatus from a network, or a recording medium on which similar functions are stored may be installed in the apparatus. As the recording medium, any form may be adopted as long as the recording medium, such as a CD-ROM, can store a program and can be read by the apparatus. Besides, the functions previously obtained by the installation or download as stated above may realize the functions in cooperation with the OS (Operation System) or the like of the inside of the apparatus.

Although the invention has been described in detail by use of the specific embodiments, it would be apparent for one of ordinary skill in the art that various modifications and improvements can be made within the range not departing from the spirit and scope of the invention.

As described above in detail, according to the invention, it is possible to provide the technique which can contribute to the improvement of management efficiency of a document file.

What is claimed is:

1. A document management system comprising:
a metadata acquisition unit configured to acquire plural metadata relating to a document as a management object, and to store the acquired plural metadata in a memory; and
a display control unit configured to hierarchically display the plural metadata in a tree form based on respective attributes of the plural metadata acquired by the metadata acquisition unit on a display,
wherein the document includes plural page images formed on each page having the metadata, and the display control unit groups, based on metadata acquired from the plural page images in common by the metadata acquisition unit, page images from which the metadata is acquired and displays the grouped page images.

2. The document management system according to claim 1, further comprising a hierarchical determination unit configured to determine hierarchies to which the plural metadata are made to correspond respectively in a tree structure hierarchically displayed by the display control unit based on the metadata acquired by the metadata acquisition unit,
wherein the display control unit hierarchically displays the plural metadata acquired by the metadata acquisition unit in the tree form based on a determination result of the hierarchical determination unit.

3. The document management system according to claim 2, wherein the hierarchical determination unit determines hierarchies to which the plural metadata are made to correspond respectively in the tree structure hierarchically displayed by the display control unit based on a dependence relation between the metadata acquired by the metadata acquisition unit.

4. The document management system according to claim 2, further comprising a frequency determination unit configured to determine an appearance frequency, in the plural metadata, of arbitrary metadata of the plural metadata acquired by the metadata acquisition unit,
wherein the display control unit displays metadata with a high appearance frequency determined by the frequency determination unit to be positioned at an upper level among metadata belonging to a hierarchy to which the metadata belongs.

5. The document management system according to claim 2, further comprising an order determination unit configured to determine an appearance order of metadata acquired by the metadata acquisition unit in a document including, as content, the metadata or information relating to the metadata,
wherein the display control unit displays metadata appearing early in the appearance order determined by the order determination unit to be positioned at an upper level among metadata belonging to a hierarchy to which the metadata belongs.

6. The document management system according to claim 1, wherein in respective trees individually made to correspond to each metadata having a specified attribute included in the plural metadata acquired by the metadata acquisition unit, the display control unit hierarchically displays metadata made to correspond to the respective trees and relevant metadata.

7. The document management system according to claim 1, further comprising an operation input unit configured to accept an operation input of a user,
wherein in respective trees individually made to correspond to each metadata having an attribute selected by the operation input to the operation input unit among the plural metadata acquired by the metadata acquisition unit, the display control unit hierarchically displays metadata made to correspond to the respective trees and relevant metadata.

8. The document management system according to claim 1, wherein the metadata is data relating to at least one of a file name of the document as the management object, a file creation date of the document, a file creation place of the document, setting content set in a file of the document, text information extracted from content of the document, and layout information of a display object in a page of the document.

9. A document management method comprising:
acquiring plural metadata relating to a document as a management object; and
hierarchically displaying the plural metadata in a tree form based on respective attributes of the acquired plural metadata,
wherein the document includes plural page images formed on each paging having the metadata, and based on metadata acquired in common from the plural page images, page images from which the metadata is acquired are grouped and the grouped page images are displayed.

10. The document management method according to claim 9, wherein
hierarchies to which the plural metadata are respectively made to correspond in a hierarchically displayed tree structure are determined based on the acquired metadata, and
the acquired plural metadata are hierarchically displayed in the tree form based on a determination result.

11. The document management method according to claim 10, wherein hierarchies to which the plural metadata are respectively made to correspond in the hierarchically displayed tree structure are determined based on a dependence relation between the acquired metadata.

12. The document management method according to claim 10, wherein
an appearance frequency, in the plural metadata, of arbitrary metadata of the acquired plural metadata is determined, and
metadata in which the determined appearance frequency is high is displayed to be positioned at an upper level among metadata belonging to a hierarchy to which the metadata belongs.

13. The document management method according to claim 10, wherein
an appearance order of the acquired metadata in a document including, as content, the metadata or information relating to the metadata is determined, and
metadata appearing early in the determined appearance order is displayed to be positioned at an upper level among metadata belonging to a hierarchy to which the metadata belongs.

14. The document management method according to claim 9, wherein in respective trees individually made to correspond to each metadata having a specified attribute included in the acquired plural metadata, metadata made to correspond to the respective trees and relevant metadata are hierarchically displayed.

15. The document management method according to claim 9, wherein in respective trees individually made to correspond to each metadata having an attribute selected by an operation input of a user among the acquired plural metadata, metadata made to correspond to the respective trees and relevant metadata are hierarchically displayed.

16. The document management method according to claim 9, wherein the metadata is data relating to at least one of a file name of the document as the management object, a file creation date of the document, a file creation place of the document, setting content set in a file of the document, text information extracted from content of the document, and layout information of a display object in a page of the document.

17. A computer-readable storage medium storing a computer program which causes a computer to execute a process comprising:
acquiring plural metadata relating to a document as a management objects; and
hierarchically displaying the plural metadata in a tree form based on respective attributes of the acquired plural metadata,
wherein the document includes plural page images formed on each page having the metadata, and the display control unit groups, based on metadata acquired from the plural page images in common by the metadata acquisition unit, page images from which the metadata is acquired and displays the grouped page images.

18. The computer-readable storage medium according to claim 17, wherein the computer program causes the computer to execute a process comprising:
determining hierarchies to which the plural metadata are made to correspond respectively in a hierarchically displayed tree structure based on the acquired metadata; and
hierarchically displaying the acquired plural metadata in the tree form based on a determination result.

* * * * *